(12) United States Patent
Liang et al.

(10) Patent No.: US 7,351,304 B2
(45) Date of Patent: Apr. 1, 2008

(54) METHOD AND APPARATUS FOR REDUCING SURFACE DEFECTS

(75) Inventors: Erwin Wenti Liang, Ballston Lake, NY (US); Harland Lynn Hayden, Amsterdam, NY (US); Dennis Michael Jacobs, Amsterdam, NY (US); Dennis Joseph Coyle, Clifton Park, NY (US); Alvin Un-Teh Chen, Fairfax, VA (US); Donald Bruce Sorensen, Scotia, NY (US); Richard Robert Edwards, Huntsville, AL (US)

(73) Assignee: General Electric Company, Schenectady, NY (US)

(*) Notice: Subject to any disclaimer, the term of this patent is extended or adjusted under 35 U.S.C. 154(b) by 471 days.

(21) Appl. No.: 11/135,794

(22) Filed: May 24, 2005

(65) Prior Publication Data

US 2006/0266477 A1 Nov. 30, 2006

(51) Int. Cl.
*B32B 38/10* (2006.01)
(52) U.S. Cl. ............................. 156/344; 156/584
(58) Field of Classification Search ............... 156/247, 156/344, 584
See application file for complete search history.

(56) References Cited

U.S. PATENT DOCUMENTS

| | | | |
|---|---|---|---|
| 4,417,953 A | 11/1983 | Viellefont et al. | |
| 5,133,824 A * | 7/1992 | Huberts et al. | 156/344 |
| 5,156,863 A | 10/1992 | Pricone et al. | |
| 5,328,537 A * | 7/1994 | Shigeta | 156/233 |
| 6,258,666 B1 * | 7/2001 | Mizutani et al. | 438/258 |
| 2004/0120136 A1 | 6/2004 | Olczak et al. | |

FOREIGN PATENT DOCUMENTS

| | | |
|---|---|---|
| DE | 1 943 278 | 3/1971 |
| EP | 0 432 832 | 6/1991 |
| GB | 160554 | 3/1921 |
| GB | 338540 | 11/1930 |

OTHER PUBLICATIONS

BD Ramsey et al, "*HERO: High-Energy Replicated Optics for a Hard-X-Ray Balloon Payload*", Space Science Department, NASA/MSFC, Alabama 35812, Center for Applied Optics, University of Alabama in Huntsville, AL 35899, Raytheon ISS and University Space Research Association, 7 pages, date unknown.

NASA/Marshall X-Ray Astronomy, National Space Science and Technology Center, Marshall Space Flight Center, 3 pages, date unknown.

* cited by examiner

*Primary Examiner*—Mark A Osele

(57) ABSTRACT

A removal assembly and method for removing a submaster from a master is described. A curved tooling surface is arranged within a housing of the assembly. A first array of vacuum cups is attached to the housing adjacent a first end of the curved tooling surface, where the first array of vacuum cups are configured to provide a vacuum grip on a first portion of the submaster. A second array of vacuum cups is attached to the housing adjacent a second end of the curved tooling surface, where the second end opposes the first end, the second array of vacuum cups is configured to provide a vacuum grip on a second portion of the submaster. A rotation mechanism is configured to rotationally support the master as the master is rolled along the curved tooling surface to remove the submaster.

17 Claims, 3 Drawing Sheets

METHOD AND APPARATUS FOR REDUCING SURFACE DEFECTS

BACKGROUND OF THE INVENTION

Microstructured surfaces have been widely used for many applications such as diffusers, solar cell panels, prismatic retroreflective films, microfluidics, and control surfaces for flow and heat/mass transfer. In a wide range of optical applications surfaces are textured to redirect, redistribute, or diffuse light to enhance brightness, diffusion, or reflection. Micro channels are machined on heat sinks for power electronics to improve the cooling efficiency. Microfluidic devices embedded with micro channels have been used for clinical diagnostics, chemical synthesis, biomedical analysis, etc. These micro-scale features are produced on surfaces with high precision and accuracy, and usually transferred to the surfaces of final products with a submaster fabricated from a master containing the desired microstructure. The master may be produced using various micro-machining techniques, such as precision milling or turning, on a workpiece typically made of machinable metals like copper or nickel. The submaster may be formed on the master, for example, by a micro-replication process such as electroforming.

Defects in a master, and a submaster formed from the master, due to the separation of the submaster, may occur. For example, when a submaster is formed on a master by a micro-replication process such as electroforming, and the submaster is then separated from the master for further processing, defects may occur to the master and submaster during separation. For example, during the separation, rubbing and reattachment between the master and submaster tend to damage the delicate microstructure not only on the submaster but also on the master, causing defects including scratches, dents, and loss of geometry definition of the structures.

SUMMARY OF THE INVENTION

According to one embodiment of the invention, a removal assembly for removing a submaster from a master is provided. The assembly comprises: a housing; a curved tooling surface arranged within the housing; a first array of vacuum cups attached to the housing adjacent a first end of the curved tooling surface, the first array of vacuum cups configured to provide a vacuum grip on a first portion of the submaster; a second array of vacuum cups attached to the housing adjacent a second end of the curved tooling surface, the second end opposing the first end, the second array of vacuum cups configured to provide a vacuum grip on a second portion of the submaster; and a rotation mechanism configured to rotationally support the master as the master is rolled along the curved tooling surface to remove the submaster.

According to another embodiment of the invention, a method of removing a submaster from a master is provided. The method comprises: arranging the master with submaster thereon at a first region on a curved tooling surface; applying vacuum to a first array of vacuum cups to secure the first array of vacuum cups to a first portion of the submaster; rotating the master along the curved tooling surface from the first region toward a second region of the curved tooling surface while vacuum is applied to the first array of vacuum cups so that the submaster detaches from the master and is supported by the curved tooling surface; applying vacuum to a second array of vacuum cups to secure the second array of vacuum cups to a second portion of the submaster while vacuum continues to be applied to the first array securing the first portion of the submaster; and removing the master form the curved tooling surface.

These and other aspects, advantages, and salient features of the present invention will become apparent from the following detailed description, the accompanying drawings, and the appended claims.

DETAILED DESCRIPTION OF THE PREFERRED EMBODIMENTS

Figure 1:
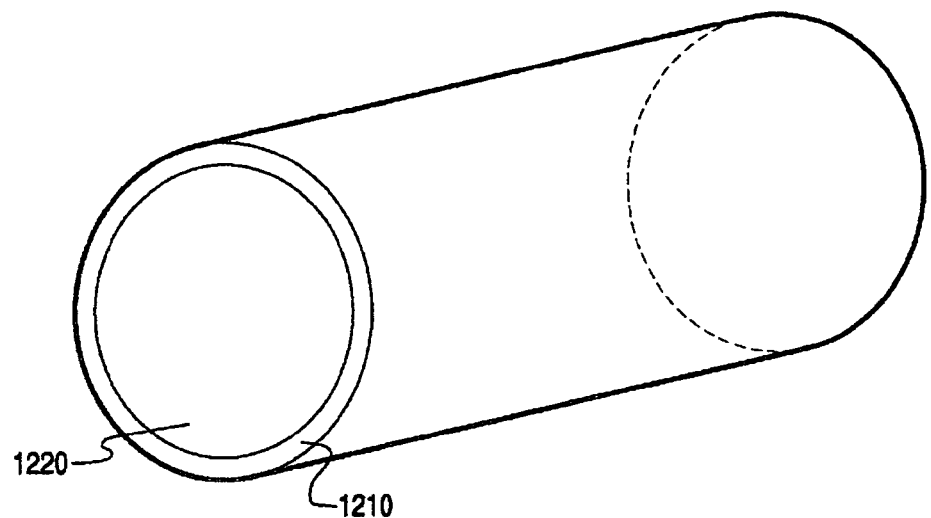
FIG. 1 is a schematic illustrating a master and submaster according to an embodiment of the invention.

In the following description, like reference characters designate like or corresponding parts throughout the several views shown in the figures. It is also understood that terms such as "top," "bottom," "outward," "inward," and the like are words of convenience and are not to be construed as limiting terms.

FIG. 1 is a schematic of a submaster 1210 on a master 1220. According to another aspect of the invention, the inventors have realized, that by providing an appropriate apparatus and method, the submaster 1210 may be separated from the master 1220 while minimizing the rubbing and reattaching between the submaster 1210 and master 1220. Such an apparatus and method is particular beneficial in the case where the master 1220 is to transfer a microstructure to many copies of submaster 1210. In the case that the master 1220 is to have microstructure thereon to transfer to the submaster 1210, the microstructure on the master 1220 may be produced by bringing a cutting tool into the surface of a workpiece following a planned tool path in a micro-machining process such as diamond turning as is known in the art.

The master 1220 may be a hollow aluminum cylindrically shaped drum plated with diamond-turnable copper or nickel, for example, where the microstructure is machined on the outside diameter surface of the drum. The submaster 1210 may be formed on the master, for example, by a micro-replication process such as electroforming, for example, as is known in the art. The submaster 1210 having a seam purposely produced in the electroforming process is then separated at the seam from the master 1210 for further processing. During the separation, rubbing and reattaching between the master 1220 and submaster 1210 would tend to damage the delicate microstructure not only on the submaster but also on the master, causing defects including scratches, dents, and loss of geometry definition such as prism angle (in the case that the microstructure includes prism structures). Electroform submasters from nickel, copper or chromium typically have a small amount of adhesion to the master, and in addition may possess tensile residual stress, which makes the electroform submaster grip on the master, and this adhesion needs to be overcome in the separation process. Defects once formed will degrade quality and performance of the final products, and affect all the subsequent multi-generation submasters to be generated from the master. After separation, these submasters are typically flattened to produce submasters of the next generation, and this process can continue from generation to generation to produce a tooling tree composed of thousands of tools for manufacturing the final products by a coating or embossing process. The defects formed may be aesthetic like scratches or dents visible on the products, or functional such as rounded prism tips which reduce on-axis luminance in a brightness enhancement film (in the case the brightness enhancement film with prisms are made using the submaster). A defected master can terminate the reproduction of the following copies made from the master, and subsequent generations of submasters. Therefore keeping masters intact in the separation process is critical for tooling tree development and for the product line.

Figure 2:
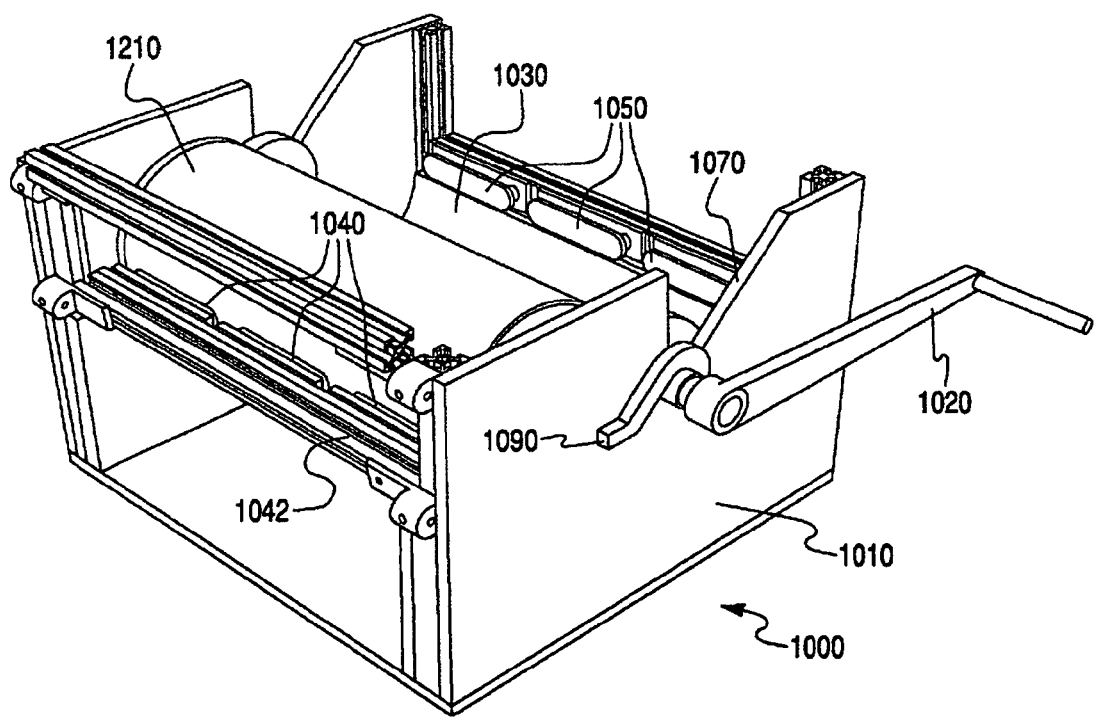
FIG. 2 is a perspective view illustrating a removal assembly according to an embodiment of the invention.

To avoid such detrimental damages caused by separation, the present inventors have devised an apparatus that minimizes potential rubbing or reattaching between the submaster 1210 and master 1220 during the separation process. FIG. 2 illustrates an apparatus (removal assembly) 1000 used to separate the submaster 1210 from the master 1220 according to another aspect of the invention. The removal assembly 1000 is for removing the submaster 1210 from the master 1220.

As seen in FIG. 2, the removal assembly includes a housing 1010, and a rotation mechanism, such as handles 1020, configured to rotationally support the master 1220 as the master 1220 is rolled along a curved tooling surface 1030 of the assembly 1000 to remove the submaster 1210. The curved tooling surface 1030, which may be semi-cylindrical, is arranged within the housing 1010. The removal assembly 1000 also includes a first array 1040 of vacuum cups, and a second array 1050 of vacuum cups.

Each handle 1020 is configured to be rotationally supported on the housing 1010, and to rotationally support the master 1220. To aid in the rotational support of the master 1220, the removal assembly 1000 may include end caps 1060 configured to be attached at opposing ends of the master 1220.

Figure 3:
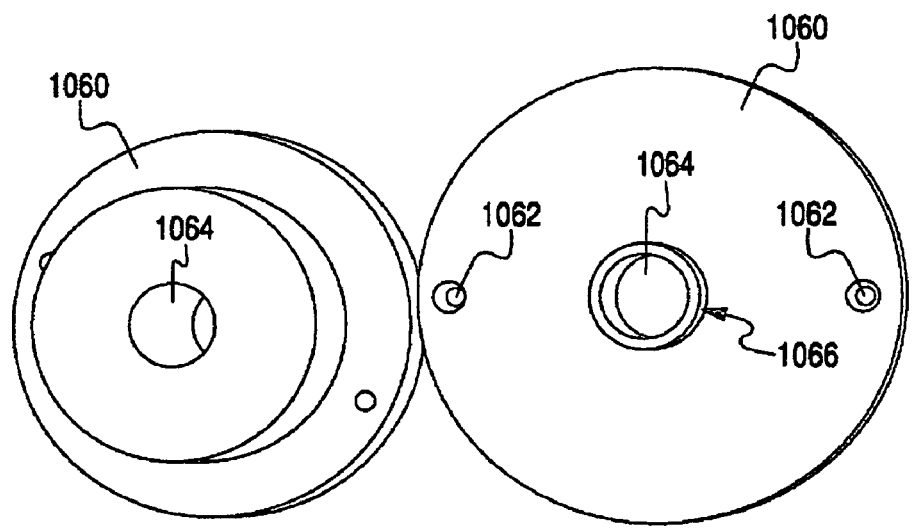
FIG. 3 are the front and back views of an end cap of the assembly of FIG. 16.
Figure 4:
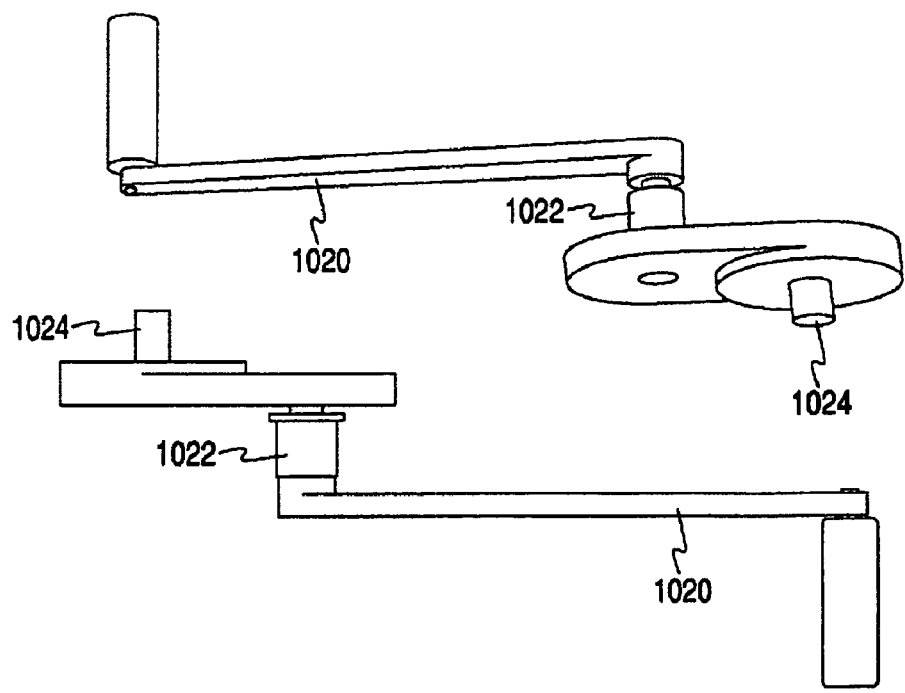
FIG. 4 are two side views of a handle of the assembly of FIG. 2.

FIGS. 3 and 4 respectively illustrate details of the end caps 1060 and the handles 1020. The end caps 1060 may have through holes 1062 so that a bolt may be passed therethrough to attach the end caps 1060 to the master 1220. The end caps 1060 also each have a central hole 1064 and bearings 1066 in the hole 1064 so that a respective handle 1020 may be engaged with the end cap 1060 at the bearings 1066. In this regard, each handle 1020 has a second shaft 1024 that is configured to engage a respective hole 1064 of an end cap 1060, so that the second shaft 1024 rotationally supports the master 1220 and allows rotation of the master 1220 about a second axis of the second shaft 1024. Each handle 1020 also has a first shaft 1022 configured to engage with a shaft support 1070 (see FIG. 2) of the housing 1010 and allow rotation of the handle 1020 about a first axis of the first shaft 1022. Thus, each handle 1020 is configured to be rotationally supported on the housing 1010, as well as to rotationally support the master 1220. The first axis of the first shaft 1022 is the center of the tooling surface 1030. The second axis of the second shaft 1024 is the center of rotation of master 1220. The two axes together control the rolling motion of master 1220 on the tooling surface 1030.

Returning to FIG. 2, both the first array 1040 of vacuum cups and second array 1050 of vacuum cups are attached to the housing 1010. The first array 1040 of vacuum cups is attached to the housing 1010 adjacent a first end of the curved tooling surface 1030. The first array 1040 of vacuum cups is configured to provide a vacuum grip on a first portion of the submaster 1210 during the process of removing the submaster 1210 from the master 1220. The second array 1050 of vacuum cups is attached to the housing 1010 adjacent a second end of the curved tooling surface 1030. The second array 1050 of vacuum cups is configured to provide a vacuum grip on a second portion of the submaster 1210 during the process of removing the submaster 1210 from the master 1220. The second end opposes the first end.

Figure 5:
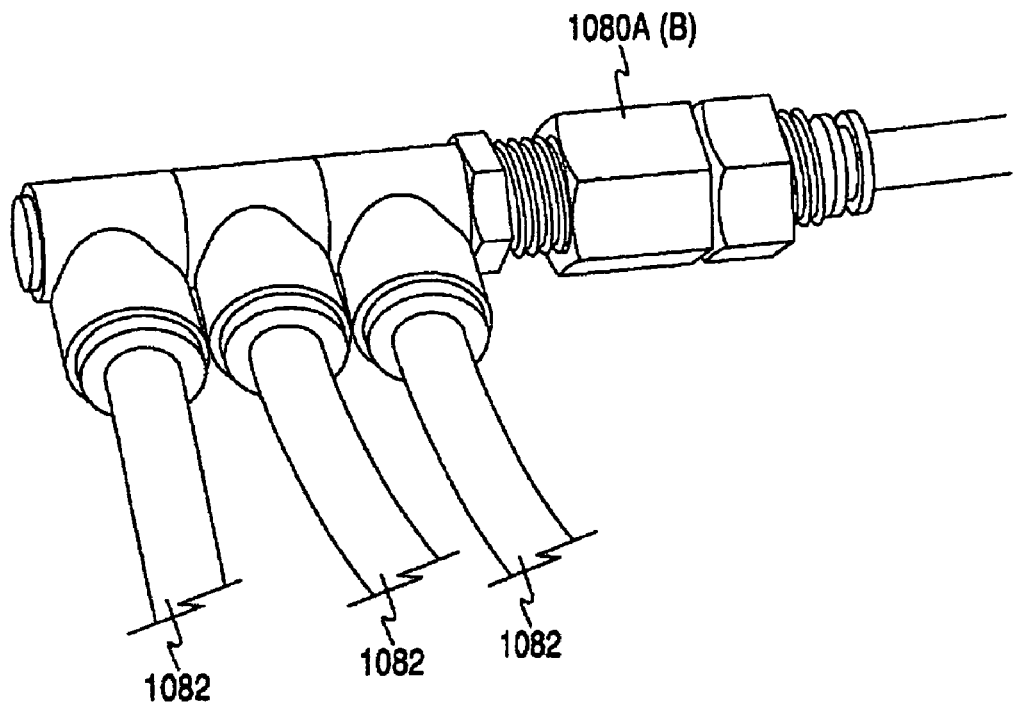
FIG. 5 is a view of a vacuum generator of a vacuum source control of the assembly of FIG. 2.

The removal assembly 1000 may also include a vacuum source control configured to supply vacuum to the first array 1040 and the second array 1050 of vacuum cups. For example, the vacuum source control may comprise two vacuum generators 1080A and 1080B (see FIG. 5) to be engaged with the first array 1040 and second array 1050, respectively, of vacuum cups. FIG. 5 illustrates a single one of the two vacuum generators which are identical. Each vacuum generator 1080A and 1080B may be a venturi vacuum generator, for example. Each vacuum generator has a number of separate vacuum lines 1082 which connect to respective of the vacuum cups to supply vacuum thereto.

Preferably, the vacuum source control allows for independent control of the vacuum supplied to the first array 1040 and the second array 1050 of vacuum cups. In this way the vacuum may be independently applied to the first array 1040 and the second array 1050 of vacuum cups without interfering vacuum force level in the other array. For example, the control may include separate valves to the vacuum generator 1080A and 1080B.

Both arrays 1040 and 1050 of the vacuum cups may be adjusted forward or backward via the vacuum cup support bars 1042. For example, the vacuum cups may be adjusted as follows. In the bottom center of each cup there may be a screw or bolt loosely attaching the cup to its respective support bar 1042 and allowing the cup to rock back and forth. The lips of the vacuum cups are compliant to allow the vacuum cups to conform to the curved surface of the master 1220, thus preventing vacuum leaks, and may be made of Silicone, Neoprene, or Rubber, for example. These cups are in position when the operator pushes the submaster against the cups.

The removal assembly 1000 may also include latches 1090 to latch respective of the handles 1020 to the housing 1010, while still allowing the handles 1020 to be rotated about the first shaft 1022 while supported by the shaft support 1070.

The curved tooling surface 1030 is shaped so that the master 1220 rolls along the curved surface 1030 as the handles 1020 are rotated. The curved tooling surface 1030, may have a circular cross-section for example. Preferably the radius of the semi-circular rolling motion as the master 1220 is rolled on the curved tooling surface 1030 during the separation of the submaster 1210 from the master 1220 is about twice the radius of the master 1220. In this regard, the axis of the first shaft 1022 is offset from the axis of the second shaft 1024. The offset between the first shaft 1022 and second shaft 1024 through the master 1220 center may be precisely designed to match the radius of the semi-circular rolling of the master 1220 on the curved tooling surface 1030. Thus, preferably the radius of curvature of the curved tooling surface 1030 is about twice the radius of the master 1220. A larger radius not only requires a larger restraining force on the submaster 1210 to prevent the submaster 1210 from springing back onto the master 1220, but also may cause micro-cracks in the submaster 1210 because of bending strain.

The removal assembly 1000 may also include a cushioning sheet 1032 (see FIG. 6) arranged, such as by lamination, on the curved tooling surface 1030, which may be steel, for example. The cushioning sheet 1032 cushions the contact between the submaster 1210 and the curved tooling surface 1030 as the master 1220 is rolled on the curved tooling surface 1030 during the separation process. The cushioning sheet 1032 may be a foam material, for example. The sheet of foam may be bonded to the curved tooling surface 1030 to provide cushion for soft contact and further assure compression. Hard contact tends to imprint roughness and texture of the tooling onto the master 1220 surface, or dent the master 1220 if any foreign particle has been rolled over, which will damage not only the master 1220 but also the submaster 1210.

Figure 6:
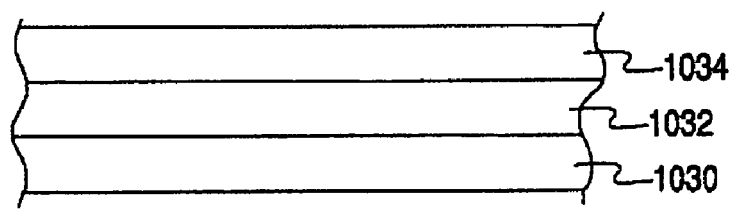
FIG. 6 is side cross sectional view of a cushioning sheet and magnetic sheet on a curved tooling surface of the assembly of FIG. 2.

The removal assembly 1000 may also include a magnetic sheet 1034 (See FIG. 20) arranged on the cushioning sheet 1032 on the curved tooling surface 1030. The magnetic sheet 1034 magnetically contacts the submaster 1210 as the master 1220 is rolled on the curved tooling surface 1030 during the separation process, so as to adhere to the submaster 1210 as its is being removed so that removed portions of the submaster 1210 do not reattach to the master 1220. The magnetic sheet 1034 may be a vinyl magnetic sheet for example. The cushioning sheet 1032 may be separate from the magnetic sheet 1034 as shown in FIG. 6, or the sheets may be a single sheet.

A method of removing the submaster 1210 from the master 1220 using the removal assembly is now described. The end caps 1060 are attached to respective ends of the master 1220 by bolting, for example, the end caps 1060 to respective ends of the master 1220 through holes 1062.

The handles 1020 are then attached to the end caps 1060 by inserting the second shaft 1024 into bearings 1066. The handles 1020 may then be used to lift and carry the master 1220 to the housing 1010. The master 1220 may then be arranged at a first region of the curved tooling surface 1030 adjacent the first array 1040 of vacuum cups.

The latches 1090 are latched to secure the first shaft 1022 to the shaft support 1070 so that the first shaft is rotationally coupled to the housing 1010 at the shaft support 1070. The master 1220 is positioned so that the vacuum cups of the first array 1040 of vacuum cups are compressed against a first portion of the submaster 1210 that is to be peeled from the master 1220. The vacuum cups of the first array 1040 of the vacuum cups may be adjusted forward or backward on the vacuum cup support bars 1042 as necessary so the vacuum cups are compressed without vacuum being applied. The master 1220 may be positioned so that the top of the vacuum cups of the first array 1040 are arranged about 0.25 inches below the end of the submaster 1210 in the first portion of the submaster 1210, for example. The vacuum cup support bars 1042 can also be adjusted to easily match in height the array of vacuum cups to the end of the submaster.

Vacuum is applied to the first array 1040 of vacuum cups to secure the first array 1040 to a first portion of the sub master 1210. The master 1220 is then rolled along the curved tooling surface 1030 toward the second array 1050 of vacuum cups while the vacuum is applied to the first array 1040 so that the submaster 1210 detaches from the master 1220, and submaster 1210 is supported by the curved tooling surface 1030. The rolling of the master 1220 is actuated by rotating the handles 1020 about the rotation axis of the first shaft 1022. As the master 1220 is continued to be rolled, the submaster 1210 continues to detach from the master 1220 to the point of contact between the master 1220 and the curved tooling surface 1030, and the detached portion of the submaster 1210 is adhered to the magnetic sheet atop of curved tooling surface 1030.

Vacuum is supplied to the second array 1050 of vacuum cups so that the second array 1050 secures the other end (second portion) of the submaster 1210 as the master 1220 is rolled by the second array 1050. The other end of the submaster 1210 is opposite the first end (portion) that is secured by the first array 1040, whereas the two ends were separated by the seam before the separation occurred.

After the submaster 1210 is separated from the master 1220, the master 1220 is removed from the housing 1010. In this regard, the latches 1090 are released, and the handles 1020 are grasped so that the master 1220 may be lifted from the housing 1010. The handles 1020 may then be removed from the end caps 1060 and master 1220, and the end caps 1060 may then be removed from the master 1220.

The vacuum supplied to the first array 1040 and the second array 1050 is then interrupted and the submaster 1210 may then be removed from the curved tooling surface 1030 and the housing. If desired, the submaster 1210 may then be flattened.

During the rolling of the master 1220, the line of contact of the master 1220 on the curved tooling surface 1030 controls the separation front and the contact is always in compression, preventing rubbing and sliding between the submaster 1210 and the master 1220. Thus, damage to the master 1220 resulting from unexpected separation can be prevented.

The use of the vacuum arrays in securing the submaster 1210 minimizes human factors in the critical process of separating the submaster 1210 from the master 1220, thus greatly reducing operator-dependent variation and producing consistent quality. As compared with manual separation where fingers are between an electroformed submaster and master for gripping and peeling, vacuum cups provide consistent gripping force and may operate on the non-textured side (away from the master) and in a smaller area. This reduces the probability of contamination of the handled area. Further, the compression at the line of contact of the master 1220 on the curved tooling surface 1030 prevents rubbing and sliding between the submaster 1210 and the master 1220, and thus any damage to the master 1220 caused by unexpected separation.

The submaster 1210, once separated from the master 1220, is secured to the curved tooling surface 1030 by the first array 1040 and second array 1050 of vacuum cup located at the beginning and end of the rolling separation and by the magnetic sheet in between. This means of securing the submaster 1210 during separation prevents the submaster from reattaching to the master 1220 and thus damaging the master 1220.

The embodiment of FIG. 2 illustrates the rotation mechanism, which is configured to rotationally support the master 1220 as the master 1220 is rolled along the curved tooling surface to remove the submaster, to be handles 1020. As an alternative or in addition, the rotation mechanism may include a motor configured to rotate the master 1220. In this case the drive of the motor may drive the rotation of the end caps 1060, for example.

While typical embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

What is claimed is:

1. A removal assembly for removing a submaster from a master, comprising:
   a housing;
   a curved tooling surface arranged within the housing;
   a first array of vacuum cups attached to the housing adjacent a first end of the curved tooling surface, the first array of vacuum cups configured to provide a vacuum grip on a first portion of the submaster;
   a second array of vacuum cups attached to the housing adjacent a second end of the curved tooling surface, the second end opposing the first end, the second array of vacuum cups configured to provide a vacuum grip on a second portion of the submaster; and
   a rotation mechanism configured to rotationally support the master as the master is rolled along the curved tooling surface to remove the submaster.

2. The removal assembly of claim 1, wherein the rotation mechanism comprises a motor configured to rotate the master.

3. The removal assembly of claim 1, wherein the rotation mechanism comprises a handle configured to be rotationally supported on the housing and to rotationally support the master.

4. The removal assembly of claim 3, wherein the handle includes a first shaft configured to engage with a shaft support of the housing and allow rotation of the handle about a first axis of the first shaft, and a second shaft configured to rotationally support the master and allow rotation about a second axis of the second shaft, the second axis being offset from the first axis.

5. The removal assembly of claim 3, wherein the curved tooling surface has a circular cross-section.

6. The removal assembly of claim 3, further comprising:
   two end caps, each end cap configured to be attached to a respective end of the master, and having a hole to rotationally couple to the handle.

7. The removal assembly of claim 3, further comprising: at least one latch for latching the handle to the housing.

8. The removal assembly of claim 3, further comprising a vacuum source control configured to independently control the vacuum source to the first array of vacuum cups and the second array of vacuum cups.

9. The removal assembly of claim 8, wherein the vacuum source control comprises a first vacuum generator for providing vacuum to the first array of vacuum cups and a second vacuum generator for providing vacuum to the second array of vacuum cups.

10. The removal assembly of claim 3, further comprising:
    a cushioning sheet arranged on the curved tooling surface for cushioning the contact between the submaster and the curved tooling surface.

11. The removal assembly of claim 10, further comprising a magnetic sheet for magnetically contacting the submaster.

12. A method of removing a submaster from a master, comprising:
    arranging the master with submaster thereon at a first region on a curved tooling surface;
    applying vacuum to a first array of vacuum cups to secure the first array of vacuum cups to a first portion of the submaster;
    rotating the master along the curved tooling surface from the first region toward a second region of the curved tooling surface while vacuum is applied to the first array of vacuum cups so that the submaster detaches from the master and is supported by the curved tooling surface;
    applying vacuum to a second array of vacuum cups to secure the second array of vacuum cups to a second portion of the submaster while vacuum continues to be applied to the first array securing the first portion of the submaster; and
    removing the master form the curved tooling surface.

13. The method of claim 12, further comprising:
    attaching handles to the master before the arranging step.

14. The method of claim 13, further comprising:
    removing the handles from the master after removing the master from the curved tooling surface.

15. The method of claim 13, wherein the attaching handles to the master step comprises:
    attaching end caps to opposing ends of the master; and
    attaching the handles to respective of the end caps.

16. The method of claim 15, further comprising:
    removing the end caps from the master after removing the master from the curved tooling surface.

17. The method of claim 12, wherein the rotating the master step comprises rotating the master using a motor.

* * * * *